3,205,191
COLD-SETTING FOUNDRY SAND COMPOSITION
David D. Watson, Barrington, Lloyd H. Brown, Crystal Lake, and Kenneth J. Siegfried, Barrington, Ill., assignors to The Quaker Oats Company, Chicago, Ill., a corporation of New Jersey
No Drawing. Filed Sept. 27, 1960, Ser. No. 58,651
4 Claims. (Cl. 260—37)

This invention relates to a novel, anhydrous, rapid-setting corebinder composition containing furfuryl alcohol particularly adapted for use in foundry sand mixes.

In the formation of cores it is obviously advantageous to cure the corebinder at room temperature if possible without the necessity of applying heat to the final molded composition. It would in addition be most desirable if the cross formed would be strong during pouring of the metal and yet possess desired burn-out qualities whereby the core may be readily removable from the final cast product by shaking out following a metal casting operation.

It is an object of this invention, therefore, to provide novel corebinders utilizing furfuryl alcohol which may be cured rapidly at room or elevated temperatures, at atmospheric pressures, and method for using the same.

It is another object of this invention to provide a novel anhydrous corebinder composition which evolves less gas at metal-pouring temperatures than other known corebinders, thus maintaining the formation of blow holes in the cast article at a minimum.

It is a further object of this invention to provide corebinders which dispense with a common odor problem experienced when employing corebinders employing formaldehyde.

It is another object of this invention to provide a furfuryl alcohol corebinder which is less costly and which possesses greater cured strength than known resinous corebinders.

The above and other objects of this invention will become more apparent from a reading of the following disclosure in the light of the appended claims.

In one embodiment of this invention a foundry sand composition for forming cores is prepared by mixing sand with a corebinder comprising furfuryl alcohol, formaldehyde and an acid catalyst. The sand is first uniformly mixed with an acid catalyst for a sufficient time, approximately two minutes, to assure the formation of a homogeneous mixture. Following the addition of the acid catalyst about 1.5% by weight of a binder, based on the weight of sand, and containing furfuryl alcohol and paraformaldehyde is added at the muller and mixed with sand for approximately 3 minutes, thereby forming a second homogeneous mixture. The resulting composition after curing for 20 hours at 75° F. in a desiccator at 0% humidity provides a tensile strength at 410 p.s.i.

The corebinder compositions of this invention are also adaptable for use in shell molding because of their high cured strength and ability to provide excellent reproductibility of a pattern surface.

The corebinders hereinafter disclosed may be varied in composition to provide desired properties of rapid cure, absence of odor and high strength at varying humidities.

COLD-SETTING COMPOSITIONS

Cold-setting core-forming compositions of this invention may be prepared which cure at room temperature and possess tensile strengths in excess of 400 p.s.i., well beyond the generally accepted minimum tensile strength of 250 p.s.i. for cured cores. These cold-setting strengths are also higher than those obtained with other known corebinders, such as urea-formaldehyde-furfuryl alcohol compositions or furfuryl alcohol resin-formaldehyde compositions.

*Example 1*

A cold-setting corebinder in the amount of 1.5% based on the weight of the sand and composed of 10% paraformaldehyde and 90% furfuryl alcohol monomer was mixed with sand having an acid catalyst coating. The tensile strength of a specimen made from the corebinder and sand averaged 410 p.s.i. after curing 20 hours at room temperature at 0% humidity. The acid catalyst was 85% phosphoric acid and present in the amount of 18% based on the weight of the corebinder. The catalyst was first mixed with the sand prior to admixture with the alcohol and formaldehyde. It should be noted that most of the strength in the cured composition was acquired in the first three hours of curing time.

It has been found that the cold-setting corebinders are adversely affected strengthwise by humidity in the surrounding atmosphere. The lessening in strength of cold-setting compositions subjected to relative humidities in excess of 60% is very pronounced.

*Example 2*

The above described cold-setting composition of Example 1 upon being subjected to an 80% relative humidity atmosphere during curing possessed a tensile strength of only 76 p.s.i. after curing time of 20 hours. The reduction in strength occasioned by the humidity is at least partially reversible inasmuch as the cold-setting composition of Example 1 having a 410 p.s.i. tensile strength was reduced to a 55 p.s.i. tensile strength when subjected overnight to an 80% relative humidity atmosphere.

The composition of Example 2 having a tensile strength of only 76 p.s.i. after curing in an 80% relative humidity atmosphere increased in tensile strength to 285 p.s.i. when left in a desiccator maintained at 0% relative humidity overnight.

The reduction in tensile strength of foundry sand composition cured under high humidity conditions is observed also for hot-cured specimens when utilizing a phosphoric acid catalyst.

*Example 3*

The cold-setting ingredients of Example 1 were employed in a process in which the paraformaldehyde and furfuryl alcohol were added separately at the muller rather than premixed prior to adding to the sand at the muller. The latter composition provided a 409 p.s.i. tensile strength after baking 2 minutes at 425° F. and storage overnight at 0% relative humidity. The same composition provided only a 56 p.s.i. tensile strength after storage at 80% relative humidity. The strength loss in the above-described foundry sand compositions occasioned by humidity conditions is evidently a reversible plastization by water.

METHOD OF MIXING FORMALDEHYDE AND FURFURYL ALCOHOL AFFECTS STRENGTH OF CURED PRODUCT

It has also been found that the manner in which the paraformaldehyde and furfuryl alcohol are admixed with the catalyst-coated sand has an effect on the ultimate tensile strength of the cured product. In Example 1 the paraformaldehyde was dissolved in 9 times its own weight of furfuryl alcohol before admixing with the catalyst-coated sand. However, when the same quantities of paraformaldehyde and furfuryl alcohol were added separately and unmixed to the catalyst-coated sand at the muller, the tensile strength of the cured ingredients of Example 1 at 0% relative humidity was only 332 p.s.i. and at 80% relative humidity only 56 p.s.i. The admixture of the paraformaldehyde and furfuryl alcohol prior to mixing the same with the catalyst-coated sand enables the paraformaldehyde to break down into formaldehyde so that ample amounts thereof are available for polymerization when subsequently added to the sand. All of the cold-setting products formed using the ingredients of Example 1 were cured at a temperature of 75° F.

By way of comparison, a system based on 2.3% of a commercial furfuryl alcohol-formaldehyde resin effects a tensile strength of 382 p.s.i. at 0% relative humidity and 75 p.s.i. at 80% relative humidity when cured at 75° F. These comparative results emphasize the desirability of employing a low viscosity binder for maximum strength. The fluid furfuryl alcohol is readily distributed in a uniform manner in the mixes in which employed whereby optimum strength is obtained from the quantity employed. However, solid resins are uniformly distributed in a core-forming composition only with difficulty and accordingly are not as efficiently utilized as the liquid alcohol.

It should also be noted that attempts to improve green strength by adding viscosity modifiers to furfuryl alcohol have always resulted in reduced tensile strength. It appears, therefore, that low viscosity is necessary for maximum strength.

In addition to providing more strength per unit weight the furfuryl alcohol monomer is less costly than the solid resins since the resin-forming steps are entirely avoided and the liquid binder cures more rapidly. Also, it has been found that binders formed from furfuryl alcohol monomer and low viscosity resins thereof evolve less gas at metal-pouring temperatures than conventional solid resin binders such as the phenolics. Obviously, the mere fact that less of the monomer may be used in the course of core formation alone indicates that less gas will evolve.

The foundry sand composition of this invention may be used not only for the formation of cores, but also for forming shell molds. The minimum amount of gas evolution of the binder at metal-pouring temperatures renders the foundry sand composition described particularly well adapted for shell formation.

Cores formed from the foundry sand compositions herein described retain their desired shape until initial solidification of the cast metal, after which the core binder will burn out sufficiently so that the core residue may be rapidly shaken out of the cast object. The binder may be varied so that the foundry sand composition will have desired shake-out and burn-out properties regardless of the temperature of the metal being cast.

HOT-CURING FOUNDRY SAND COMPOSITIONS

For hot-core box work a mixture of 95% dodecylbenzene sulfonic acid and 5% sulfuric acid has been found to function satisfactorily as a catalyst for purposes of providing high strength and quick curing action in the core-forming compositions employing furfuryl alcohol. The catalyst should be employed in the amount of approximately 5 parts per 100 parts by weight of the binder and as in the case of the phosphoric acid catalyst should be distributed on the sand before the binder addition to the sand. In order to facilitate admixture of the dodecylbenzene sulfonic acid catalyst with the sand an equal volume of alcohol is added thereto.

The following Table I sets forth a number of examples of core-forming compositions cured at 500° F. employing a catalyst of 95% dodecylbenzene sulfonic acid mixed with 5% sulfuric acid. The catalyst was present in the amount of 5 parts per 100 parts by weight of the binder comprising furfuryl alcohol and varying amounts of paraformaldehyde which were premixed prior to adding to the sand. The binder of the following examples was present in the amount of 1.5% based on the weight of the sand.

TABLE I

| Percent Paraform | Curing Time (min.) | Tensile Strength (p.s.i.) |
|---|---|---|
| 10 | 4 | 353 |
| 5 | 4 | 353 |
| 5 | 6 | 339 |
| 0 | 4 | 261 |
| 0 | 6 | 341 |
| 0 | 7 | 360 |

It will be noted from the above Table I that at the elevated curing temperature and high acidity conditions present in the course of forming the examples, strength was not dependent upon paraformaldehyde content.

It will be seen from subjoined Table II, however, that at low acidity conditions effected by a 2.5% phosphoric acid content based on the binder weight, strength as well as curing speed varied with paraformaldehyde content. In the examples of Table II binder content was 2% based on sand; the furfuryl alcohol and paraformaldehyde were added separately, unmixed, at the muller and the curing temperature was 425° F.

TABLE II

| Percent Paraform | Curing Time (min.) | Tensile Strength (p.s.i.) |
|---|---|---|
| 0 | 5 | 40 |
| 0 | 10 | 195 |
| 0 | 15 | 220 |
| 5 | 5 | 329 |
| 8.3 | 5 | 364 |
| 16.6 | 5 | 376 |

As indicated by Table II, the tensile strengths of the examples tabulated therein were approximately the same as those set forth in Table I employing ½% less binder. This difference in strength is partially owing to the difference in the manners in which the furfuryl alcohol and paraformaldehyde were applied to the catalyst-coated sand.

Although as above noted, humidity adversely affects the strength of cured compositions utilizing phosphoric acid as a catalyst, the use of dodecylbenzene sulfonic acid as a catalyst in hot curing compositions shows marked improvement in humidity resistance.

Utilizing 5 parts by weight of aged dodecylbenzene sulfonic acid as a catalyst per hundred parts of furfuryl alcohol, specimens of foundry sand mixes containing 1.5% binder based on the weight of the sand provided the results of subjoined Table III:

TABLE III

| Percent Paraform | Curing Time at 425° F., min. | 0% RH | 80% RH |
|---|---|---|---|
| 10 | 5 | 287 | 210 |
| 0 | 7 | 360 | 283 |

The term dodecylbenzene sulfonic acid as previously and hereinafter used refers to technical grade dodecylbenzene sulfonic acid (Sulfonic 100, Stepan Chemical Co.) containing 5% added sulfuric acid of 66° gravity Baumé. This is equivalent in activity to aged dodecylbenzene sulfonic acid and for purposes of this invention the two materials are equivalents. The following Table IV indicates that a system containing 1.5% of a binder consisting of 1 part by weight paraformaldehyde dissolved in 9 parts furfuryl alcohol (formed by heating on a steam bath 8 hours) and fresh dodecylbenzene sulfonic acid does not give desired strength which is obtainable with aged dodecylbenzene sulfonic acid or its equivalent. In the following examples of Table IV curing time was 4 minutes at a curing temperature of 425° F.

TABLE IV

| Catalyst | Quantity in Parts per 100 based on the weight of the binder | Tensile Strength (p.s.i.) |
|---|---|---|
| Fresh Sulfonic 100 | 5 | 229 |
| Do | 7.5 | 240 |
| Do | 10 | 188 |
| Aged Sulfonic 100 | 5 | 325 |
| Fresh Sulfonic 100 plus 5% H₂SO₄ | 5 | 316 |

Since dodecylbenzene sulfonic acid is an extremely viscous liquid, it is normally used with an equal volume of isopropanol to facilitate distribution. However, a solution of dodecylbenzene sulfonic acid in isopropanol should not be used for more than a day. After standing four days, strengths from a system comparable to the last example listed in Table IV declined to 236 p.s.i.

The manner in which the paraformaldehyde is dissolved in the furfuryl alcohol appears to influence the strength of the resulting samples. In the examples listed in above Table IV heating time was 8 hours on a steam bath and a clear solution was obtained when the paraformaldehyde was dissolved in the furfuryl alcohol. A solution of furfuryl alcohol and paraformaldehyde heated only two hours on a steam bath dissolved about 90% of the paraformaldehyde with 10% still suspended. This solution gave satisfactory strengths of about 360 p.s.i. when utilized with 5 parts per weight of the dodecylbenzene sulfonic acid-sulfuric acid mixture and cured in the manner of the examples of Table IV. This latter method of incompletely dissolving paraformaldehyde in the furfuryl alcohol appears to be very satisfactory for purposes of forming the core-forming compositions of this invention.

ELIMINATION OF FORMALDEHYDE ODOR

The generation of a formaldehyde odor in the course of curing core binders creates a major problem in those installations where inadequate ventilation equipment is present. This problem may be partially solved by adding about 5% urea based on the weight of the binder at the muller as indicated by the examples in subjoined Table V. However, cure was slow at a curing temperature of 425° F. when the dodecylbenzene sulfonic acid catalyst plus 5% sulfuric acid remained at the 5% level based on the weight of binder; also sandy surfaces were obtained on the samples. In the following examples 1.5% binder based on the weight of the sand was employed.

TABLE V

| Aged Dodecylbenzene Sulfonic Acid in parts per 100 based on weight of binder | Curing Time (min.) | Tensile Strength | Surfaces |
|---|---|---|---|
| 5 | 5 | 328 | Sandy. |
| 5 | 8 | 359 | Do. |
| 10 | 3 | 312 | Do. |
| 10 | 5 | 320 | Do. |
| 15 | 2 | 314 | Good. |
| 15 | 3 | 268 | Do. |

Samples containing 15 parts per hundred of dodecylbenzene sulfonic acid plus 5% sulfuric acid effected tensile strengths of 282 p.s.i. after storage overnight at 0% R.H. and tensile strengths of 101 p.s.i. after curing 80% relative humidity.

Table V indicates that by tripling the normal concentration of dodecylbenzene sulfonic acid catalyst containing sulfuric acid, cure times and surface characteristics of the cured compositions were improved when urea was employed, although the tensile strength was reduced slightly.

Cure times are shortened by increasing the elevated curing temperatures permissible with a furfuryl alcohol-paraformaldehyde binder containing 10% paraformaldehyde and utilizing 5% of an aged dodecylbenzene sulfonic acid catalyst based on the weight of the binder. The furfuryl alcohol-paraformaldehyde system appears to cure faster than any other system tested thus far including known systems employing a 2-package urea-formaldehyde-furfuryl alcohol binder and an acidic catalyst comprising 1.5% ammonium chloride.

Comparisons of curing speeds were made by blowing sand mixes into a hit core box, at 575–600° F. Following 6 seconds' residence time in the core box a furfuryl alcohol-paraformaldehyde mix similar to those described above effected cores which had essentially hardened in an hour. With a residence time of 6 to 10 seconds in the core box, cores made from a known urea-formaldehyde-furfuryl alcohol resin system were still quite soft after 2 hours. When cured the furfuryl alcohol-paraformaldehyde-bonded cores had harder surfaces than the others, judging by a scratch test.

METHODS OF DETERMINING TENSILE STRENGTH OF SAMPLES AND CURING SPEEDS

Tensile specimens one inch thick of the above-described examples were prepared by ramming 105–110 g. samples 3 times in a "dog biscuit" mold, striking off the excess, and transferring to aluminum plates. The biscuits were baked at 425° F., allowed to cool an hour, and tested on a Dillon tester.

Curing speeds were compared by means of ¼-inch discs of foundry sand compositions placed on a hot-plate at various temperatures. The end-point was taken as the time when the top of the disc was hard when tested with a spatula.

LOW VISCOSITY FURFURYL ALCOHOL POLYMERS

In addition to the furfuryl alcohol monomer, low viscosity polymers of furfuryl alcohol having a viscosity of less than 500 centipoises at 25° C. are suitable for purposes of this invention. The term "furfuryl alcohol" when employed in the following claims shall refer not only to the furfuryl alcohol monomer, but also to the low viscosity polymers thereof of less than 500 centipoises.

Also, in all instances trioxane may be substituted for paraformaldehyde for purposes of obtaining substantially the same results.

The formulation of a particular core or shell forming composition to suit a particular purpose is believed to be within the skill of the art in view of the above disclosure. Generally, the core binders are present in the amount of about 1 to 3% based on the weight of the sand. The catalysts may comprise 85% phosphoric acid for room or elevated temperature cores or aged dodecylbenzene sulfonic acid for hot core work in the amounts of about 2.5–25% based on the weight of the binder. The binder and catalyst amounts will vary with desired curing time, strength and sand composition particularly clay content and alkaline values thereof. The binders may comprise furfuryl alcohol or low viscosity polymers thereof having a viscosity of less than 500 centipoises in combination with up to about 20% paraformaldehyde or trioxane based on the weight of the furfuryl alcohol.

For foundry sand compositions curing at elevated temperatures of between 350–600° F. the preferred catalyst is 95% dodecylbenzene sulfonic acid and 5% by weight of sulfuric acid used at a level of 5% based on the weight of the binder. For cold-setting foundry sand compositions the catalyst is preferably 85% phosphoric acid in the amount of 18% based on the weight of the binder. For cold-curing the preferred weight range based on the binder is 15–20% of the 85% phosphoric acid.

The compositions above described may be employed for a large variety of applications and provide excellent results in addition to savings in cost of materials.

This invention is to be limited only by the scope of the pending claims.

We claim:
1. A method for forming shell molds and cores at room temperature having tensile strengths of about 400 p.s.i. comprising the steps of:
   (A) coating grains of sand with an acid catalyst comprising 85 percent by weight, based on catalyst, of phosphoric acid, said catalyst being present in the amount of about 15 to 20 percent by weight of the binder of step (B);
   (B) admixing the coated sand with about 1 to 3 percent by weight, based on sand, of a binder consisting essentially of furfuryl alcohol and a member dissolved therein, said member being present in the amount of about 10 percent by weight, based on binder, and being selected from the group consisting of formaldehyde, paraformaldehyde and trioxane;
   (C) shaping the resulting mixture into a mass of desired configuration; and
   (D) curing the resulting mass at room temperature at a relative humidity of about 0 percent for about twenty hours.

2. A foundry sand composition particularly adapted for forming cores and shell molds which are curable at room temperature comprising:
   (A) sand;
   (B) between about 1 to 3 percent by weight, based on sand, of a binder consisting essentially of furfuryl alcohol having dissolved therein a member selected from the group consisting of formaldehyde, paraformaldehyde and trioxane, said member being present in the amount of about 10 to 20 percent by weight, based on binder; and
   (C) between about 15 to 20 percent by weight, based on binder, of 85 percent phosphoric acid.

3. A method for forming cores and shell molds characterized by good burn-out and shake-out properties following utilization in a metal-casting operation, at room temperature, comprising the steps of:
   (A) coating grains of sand with a phosphoric acid catalyst;
   (B) contacting the catalyst-coated sand with about 1.5 to 3 percent by weight, based on sand, of a binder consisting essentially of furfuryl alcohol in admixture with a member selected from the group consisting of formaldehyde, paraformaldehyde and trioxane, said member being present in the amount of about 10 percent by weight, based on binder;
   (C) shaping the resulting mixture into a mass of desired configuration; and
   (D) curing the shaped mass at substantially room temperature for at least about three hours.

4. A method for forming cores and shell molds, said cores and shell molds being characterized by good burn-out and shake-out properties following utilization in a metal-casting operation, the steps comprising:
   (A) coating grains of sand with a phosphoric acid catalyst, said catalyst being present in the amount of about 15 to 20 percent by weight of the binder of step (B);
   (B) contacting the catalyst-coated sand with about 1 to 3 percent by weight, based on sand, of a binder consisting essentially of furfuryl alcohol already admixed with a member selected from the group consisting of formaldehyde, paraformaldehyde and trioxane, said member being present in the amount of about 10 percent by weight, based on binder;
   (C) shaping the resulting mixture into a mass of desired confguration; and
   (D) curing the shaped mass at room temperature for at least about three hours.

References Cited by the Examiner
UNITED STATES PATENTS

| | | | |
|---|---|---|---|
| 2,343,972 | 3/44 | Harvey. | |
| 2,383,790 | 8/45 | Harvey | 260—88.5 XR |
| 2,471,600 | 5/49 | Adams et al. | 260—37 |
| 2,776,266 | 1/57 | Harvey | 260—37 |
| 2,796,934 | 6/37 | Vogel | 260—67 |
| 2,813,846 | 11/57 | Farber et al. | |
| 2,874,148 | 2/59 | Brown | 260—37 XR |
| 2,963,463 | 12/60 | Harvey et al. | 260—37 |
| 3,008,205 | 11/61 | Blaies. | |
| 3,020,609 | 2/62 | Brown et al. | |
| 3,024,215 | 3/62 | Freeman. | |

MORRIS LIEBMAN, *Primary Examiner.*

ABRAHAM RIMENS, MILTON STERMAN, ALEXANDER H. BRODMERKEL, JULIUS GREENWALD, *Examiners.*